United States Patent
Gorokhov et al.

(10) Patent No.: US 8,295,252 B2
(45) Date of Patent: Oct. 23, 2012

(54) INTERLACE-BASED CONTROL CHANNEL BALANCING IN A WIRELESS COMMUNICATION NETWORK

(75) Inventors: Alexei Gorokhov, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1040 days.

(21) Appl. No.: 11/750,215

(22) Filed: May 17, 2007

(65) Prior Publication Data
US 2008/0013485 A1    Jan. 17, 2008

Related U.S. Application Data

(60) Provisional application No. 60/801,797, filed on May 18, 2006.

(51) Int. Cl.
H04B 7/212 (2006.01)
(52) U.S. Cl. ...... 370/337; 370/342; 370/329; 455/250.1
(58) Field of Classification Search ............... 455/250.1; 370/329, 337, 342
See application file for complete search history.

(56) References Cited

U.S. PATENT DOCUMENTS

| | | | | |
|---|---|---|---|---|
| 5,903,843 A * | 5/1999 | Suzuki et al. | ............... | 455/452.2 |
| 6,289,009 B1 * | 9/2001 | Sato | ............... | 370/342 |
| 6,671,512 B2 * | 12/2003 | Laakso | ............... | 455/453 |
| 6,963,540 B2 * | 11/2005 | Choi et al. | ............... | 370/252 |
| 7,116,651 B2 * | 10/2006 | Hakkinen et al. | ............... | 370/329 |
| 7,299,021 B2 * | 11/2007 | P rssinen et al. | ............... | 455/226.1 |
| 2004/0047328 A1 * | 3/2004 | Proctor et al. | ............... | 370/342 |
| 2006/0072533 A1 | 4/2006 | Smee et al. | | |
| 2007/0049314 A1 * | 3/2007 | Balachandran et al. | ...... | 455/518 |
| 2007/0217370 A1 * | 9/2007 | Soong et al. | ............... | 370/337 |
| 2007/0230412 A1 * | 10/2007 | McBeath et al. | ............... | 370/338 |

FOREIGN PATENT DOCUMENTS

| EP | 1005243 | | 5/2000 |
|---|---|---|---|
| EP | 1005243 A1 | * | 5/2000 |

(Continued)

OTHER PUBLICATIONS

Written Opinion—PCT/US07/069239—International Search Authority, European Patent Office—Nov. 9, 2007.
Ali F. Almutairi, etc., "Power Control Algorithm for MMSE Receiver Based CDMA Systems", IEEE Communications Letters, vol. 4, No. 11, Nov. 2000.
Taiwanese Search report—096118097—TIPO—Oct. 27, 2010.
International Search Report—PCT/US07/069239—International Search Authority—European Patent Office—Nov. 9, 2007.
Jim Tomcik: "QFDD technology overview presentation" Internet Citation, Online, Nov. 15, 2005, XP002422346.

*Primary Examiner* — George Eng
*Assistant Examiner* — Sowmini Nair
(74) *Attorney, Agent, or Firm* — Charles E. Eggers

(57) ABSTRACT

Systems and methodologies are described that provide interlace-based scheduling for control channels in a wireless communication system. One or more control channels for communication between a base station and a mobile terminal in the wireless communication system may be scheduled on one or more frame interlaces in the system based on one or more conditions of each frame interlace in the system. These conditions may include overhead balance between the frame interlaces, processing timeline optimization for the frame interlaces at the scheduling base station, and the desirability of discontinuous transmission (DTX) at a mobile terminal.

34 Claims, 13 Drawing Sheets

FOREIGN PATENT DOCUMENTS

| | | |
|---|---|---|
| JP | 8070273 A | 3/1996 |
| JP | 11041138 A | 2/1999 |
| JP | 2005518113 A | 6/2005 |
| RU | 2232471 C2 | 7/2004 |
| WO | 0108438 | 2/2001 |
| WO | WO 0108438 A1 * | 2/2001 |
| WO | WO0201761 | 1/2002 |
| WO | WO03058829 A2 | 7/2003 |
| WO | WO2004098098 | 11/2004 |
| WO | WO2004114705 | 12/2004 |

* cited by examiner

INTERLACE-BASED CONTROL CHANNEL BALANCING IN A WIRELESS COMMUNICATION NETWORK

CROSS-REFERENCE

This application claims the benefit of U.S. Provisional Application Ser. No. 60/801,797, filed May 18, 2006, entitled "CONTROL CHANNEL ASSIGNMENT IN A WIRELESS COMMUNICATION NETWORK," the entirety of which is incorporated herein by reference.

BACKGROUND

I. Field

The present disclosure relates generally to wireless communications, and more specifically to techniques for assigning resources in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

In such a multiple-access system, a base station traditionally communicates with one or more user terminals on a forward link ("downlink"), and the terminals engage in return communication with the corresponding base station on a reverse link ("uplink"). This communication between a base station and a terminal can include, for example, the communication of data on one or more data channels and signaling on one or more control channels. Traditionally, the signaling communicated through the control channels is used to ensure correct and efficient operation of the communication system. For example, reverse link control channels can be used by the terminal to communicate channel quality indicators (CQI), requests (REQ), acknowledgements/negative acknowledgements (ACK/NACK), and other feedback to the base station. However, it has traditionally been difficult, particularly in communication systems with a large number of terminals communicating with each base station, to efficiently balance the scheduling of reverse link control channels that are assigned to and used by the terminals communicating with each base station. Because the reverse link control channels are used to ensure efficient operation of the communication system, balanced assignment and scheduling of control channels is necessary for optimal performance of the system. Thus, there exists an unmet need in the art for efficient control channel assignment in a wireless communication system.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by providing interlace-based control channel balancing on the reverse link in a wireless communication system. More particularly, one or more embodiments can divide a series of physical layer frames in a reverse link transmission timeline among a plurality of frame interlaces, and one or more reverse link control channels can be provided in each of the frame interlaces. Each terminal in the system communicating with a base station can then be assigned to a reverse link control channel in a frame interlace based on one or more conditions of each frame interlace. These conditions may include overhead balance between the frame interlaces, processing timeline optimization for the frame interlaces at the base station, and the desirability of discontinuous transmission (DTX).

According to an aspect, a method for scheduling control channels in a wireless communication system is described herein. The method may comprise determining one or more of control channel loading and data channel loading for one or more frame interlaces, each frame interlace having a plurality of frames on a forward link and a reverse link. In addition, the method may comprise determining power restrictions for one or more mobile terminals in the wireless communication system. Further, the method may comprise scheduling one or more control channels for communication with a mobile terminal in the one or more mobile terminals on at least one frame interlace based at least in part on the determined the determined power restrictions for the mobile terminal and one or more of the determined data channel loading for the frame interlaces and the determined control channel loading for the frame interlaces.

Another aspect relates to a wireless communications apparatus that may include a memory that stores data relating to one or more frame interlaces, each frame interlace having a plurality of frames on a forward link and a reverse link. The wireless communications apparatus may further include a processor configured to determine at least one of loading conditions for the one or more frame interlaces and power conditions for an access terminal from the one or more access terminals and to schedule a control channel on at least one frame interlaces in the one or more frame interlaces based on at least one of the determined loading conditions and the determined power conditions.

Yet another aspect relates to an apparatus that facilitates the scheduling of control channels in a wireless communication system. The apparatus may comprise means for grouping frames on a reverse link into one or more frame interlaces. Further, the apparatus may include means for determining loading on the one or more frame interlaces and power restrictions for a wireless terminal. In addition, the apparatus may include means for scheduling one or more control channels for communication with the wireless terminal on at least one of the one or more frame interlaces based on at least one of the determined loading on the one or more frame interlaces and the determined power restrictions for the wireless terminal.

Still another aspect relates to a computer-readable medium having stored thereon computer-executable instructions for scheduling control channels in a wireless communication system. The instructions may comprise determining loading on one or more frame interlaces. The instructions may also include determining power conditions for a terminal. Further, the instructions may include assigning one or more control channels for communication with the terminal based at least in part on the determined loading and power conditions.

Additionally, the instructions may include receiving control information from the terminal on the one or more assigned control channels.

In accordance with another aspect, a processor is described herein that may execute computer-executable instructions for assigning control channels in a wireless communication system. The instructions may comprise scheduling one or more control channels for communication with a mobile terminal on one or more frame interlaces selected from a plurality of frame interlaces based at least in part on one or more of loading on the plurality of the plurality of frame interlaces and power requirements for the mobile terminal. In addition, the instructions may comprise receiving signaling from the mobile terminal on the one or more scheduled control channels.

In accordance with yet another aspect, a method for communicating control information in a wireless communication system is described herein. The method may comprise receiving an assignment for one or more control channels for communication with a base station on one or more frame interlaces selected from a plurality of frame interlaces, the assignment based at least in part on one or more of loading on the plurality of frame interlaces and a maximum transmit power restriction. Further, the method may include sending signaling to the base station using at least one assigned control channel.

Another aspect relates to a wireless communications apparatus that may include a memory that stores data relating to an assignment for at least one control channel for communication with an access point on one or more frame interlaces, the assignment based on at least one of loading conditions for the one or more frame interlaces and transmit power conditions. The wireless communications apparatus may additionally include a processor configured to send control information to the access point on an assigned control channel.

Yet another aspect relates to an apparatus that facilitates the communication of control information in a wireless communication system. The apparatus may comprise means for receiving a communication including a scheduled control channel for communication on one or more frame interlaces, wherein the control channel is scheduled to balance loading on a group of frame interlaces that includes the one or more frame interlaces and to minimize required transmit power. The apparatus may further include means for sending feedback on the scheduled control channel.

Still another aspect relates to a computer-readable medium having stored thereon computer-executable instructions for communicating signaling in a wireless communication system. The instructions may include receiving an assignment for one or more control channels, the one or more control channels are scheduled for communication on one or more frame interlaces based on one or more of control channel loading on the one or more frame interlaces, data channel loading on the one or more frame interlaces, and maximum transmit power for one or more entities in the wireless communication system. Further, the instructions may comprise transmitting control information on the one or more control channels.

In accordance with another aspect, a processor is described herein that may execute computer-executable instructions for communicating control feedback in a wireless communication system. The instructions may comprise receiving data, the data including an implicit assignment for one or more control channels for communication with a base station on one or more frame interlaces, the assignment based at least in part on one or more of loading on the one or more frame interlaces and maximum transmit power restrictions for one or more entities in the wireless communication system. Further, the instructions may include transmitting control information to the base station using at least one of the one or more assigned control channels.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
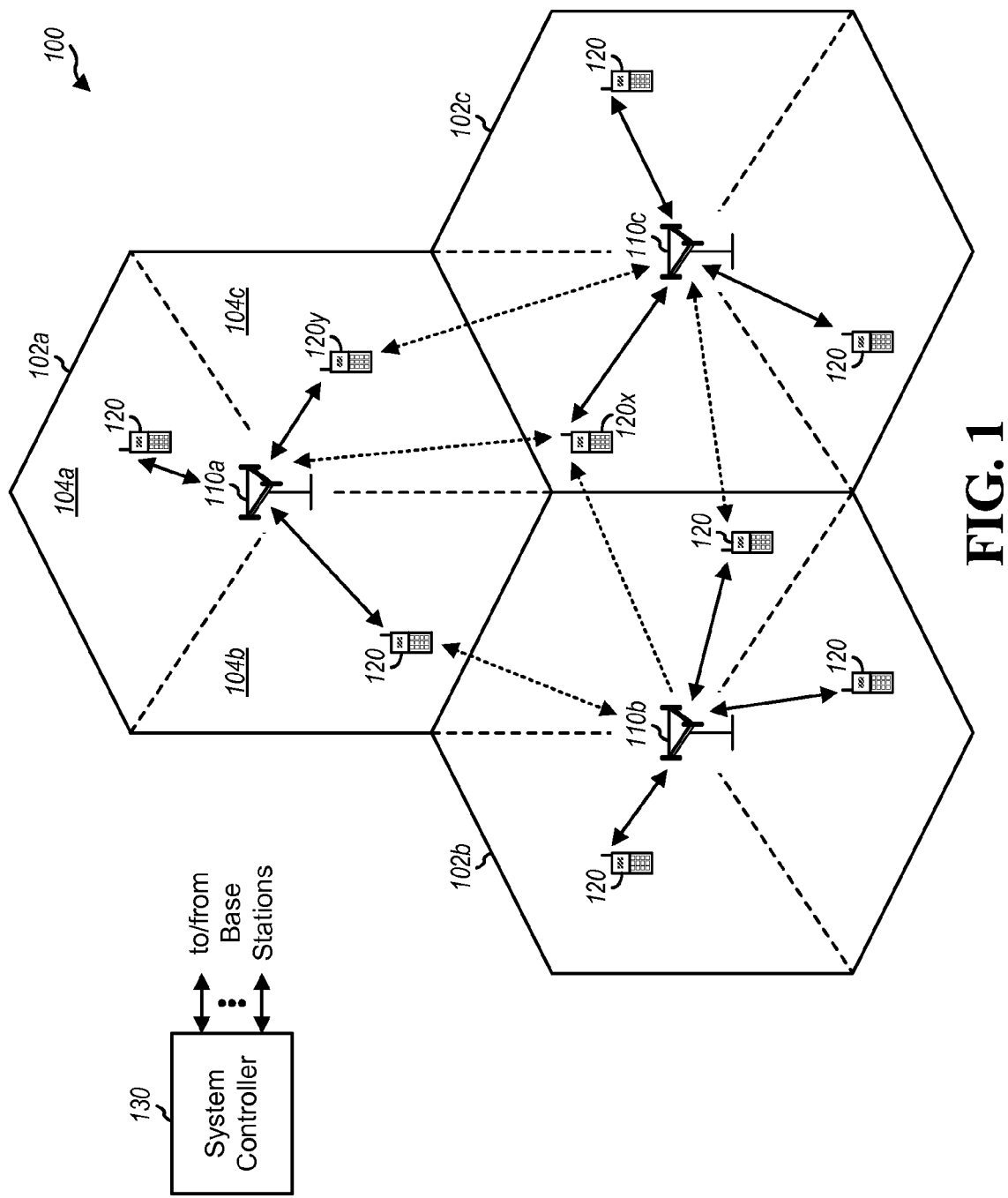
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In a cell 102 having multiple sectors 104, the BTSs for all sectors 104 of the cell 102 can be co-located within the base station 110 for the cell 102. However, it should be appreciated that the various aspects disclosed herein may be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein may refer both to a station that serves a sector as well as a station that serves a cell.

In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal 120 may be a wireless device, a cellular phone, a personal digital assistant (PDA), a wireless modem, a handheld device, or another appropriate device. Further, a terminal 120 may communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed.

In accordance with another aspect, base stations 110 and terminals 120 in system 100 may communicate with each other on a forward link and a reverse link by using one or more channels. In one non-limiting example, system 100 may utilize frequency-hopping OFDMA (FH-OFDMA), in which a channel may be defined by groups of M sub-carriers or tones that hop together once every N modulation symbols. Thus, in one example, a block in the time-frequency plane can correspond to a rectangular N×M grid of modulation symbols. Channels can then be defined by one or more such blocks, which may be assigned to physical sub-carriers by a hop-permutation of periodicity N. Further, the number of sub-carriers and modulation symbols used can be chosen so that each channel remains substantially constant during frequency hopping, thereby allowing each channel to be estimated based on pilot symbols inserted in the block. By way of a non-limiting example, a block may be defined by 8-sub-carriers over 8 modulation symbols. In another non-limiting example, a block may be defined by 8 sub-carriers over 16 modulation symbols. In another non-limiting example, system 100 may utilize CDMA, in which a channel may also be composed of blocks of a predetermined number of sub-carriers over a predetermined number of modulation symbols. Unlike FH-OFDMA, however, CDMA allows multiplexing of multiple mobile terminals 120 such that they can communicate with a base station 110 using a single CDMA channel.

In accordance with another aspect, base stations 110 and mobile terminals 120 in system 100 can communicate data using data channels and signaling using control channels. In one example, control channels may have the same structure as data channels. However, as in the non-limiting example of a system 100 that utilizes CDMA, a single control channel may be capable of handling control transmissions for multiple mobile terminals 110. Thus, a control channel may be shared among multiple mobile terminals 110. In one example, each modulation symbol in a control channel can be repeated P times with a P-ary Walsh code overlay or exponential code overlay, thereby allowing P mobile terminals 110 to share a single control channel. In this example, each mobile terminal 110 may send (M*N)/P modulation symbols, each with P-ary repetition. Thus, mobile terminals 110 may be distinguished by a Walsh code unique to each mobile terminal 110. In one example, each mobile terminal 110 can generate modulation symbols by utilizing a symbol-mapping function for one or more control information bits. Further, Walsh-repeated symbols may be placed in close proximity to each other in time and frequency to allow the symbols to see a similar propagation channel, thereby allowing one or more mobile terminals 110 to remain orthogonal.

Figure 2:
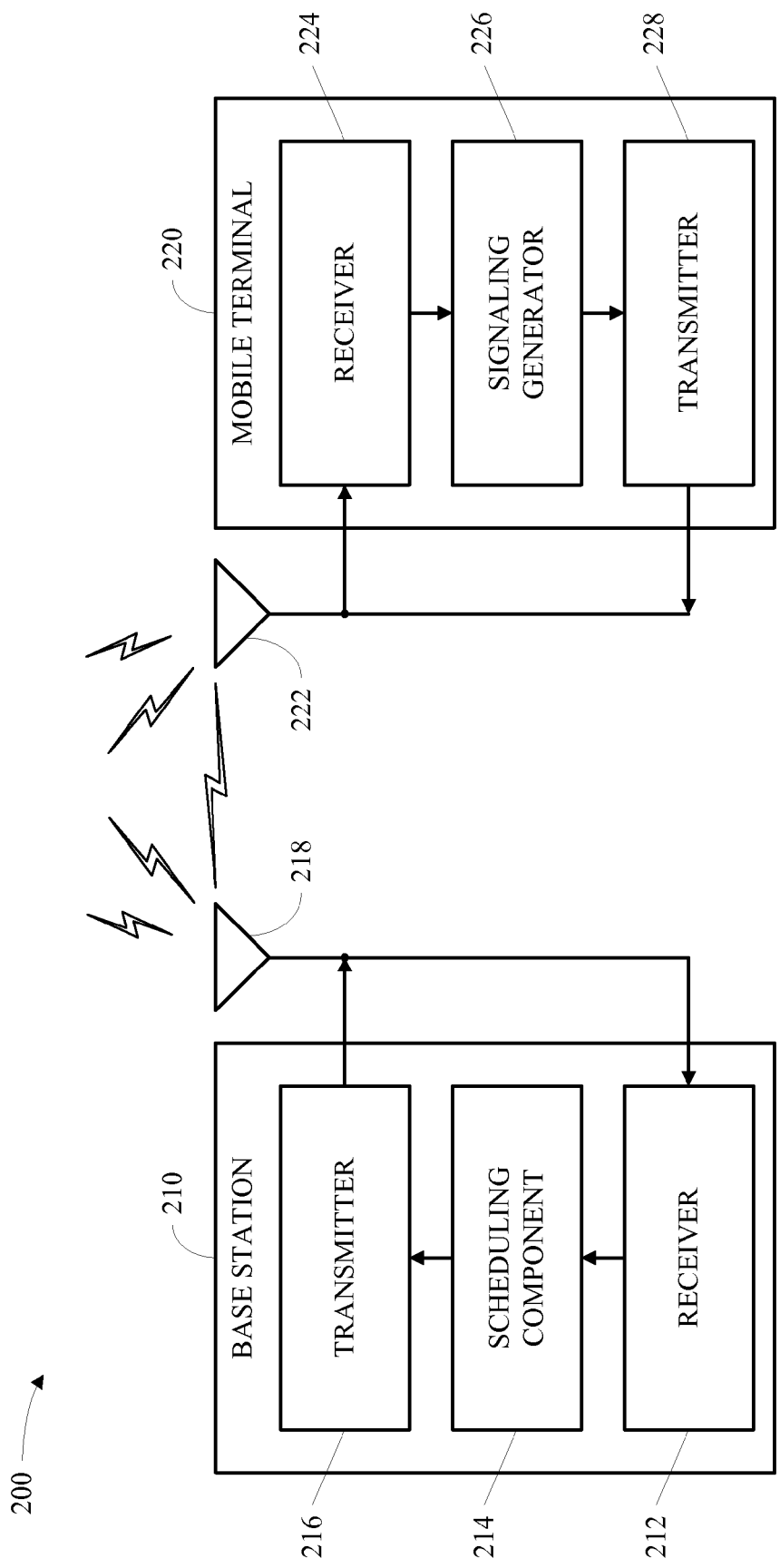
FIG. 2 is a block diagram of a system that provides interlace-based control channel balancing in a wireless communication network in accordance with various aspects described herein.

FIG. 2 is a block diagram of a system 200 that provides interlace-based control channel balancing in a wireless communication network in accordance with various aspects described herein. In one example, system 200 includes one or more base stations 210 and one or more mobile terminals 220. While only one base station 210 and one mobile terminal 220 are illustrated in FIG. 2 for simplicity, it should be appreciated that system 200 may include any number of base stations 210 and mobile terminals 220. In accordance with one aspect, base station 210 and mobile terminal 220 can communicate via antenna 218 at base station 210 and antenna 222 at mobile terminal 220. Alternatively, base station 210 and/or mobile terminal 220 may have a plurality of antennas 218 and/or 222 for communicating with multiple base stations 210 and/or mobile terminals 220 in system 200. Further, base station 210 and mobile terminal 220 may communicate by using one or more of CDMA, OFDMA, and/or other appropriate communication techniques.

In one example, base station 210 and mobile terminal 220 can communicate data and signaling to each other on a forward link and a reverse link. The data communicated between base station 210 and mobile terminal 220 may include, for example, voice data, video signals, packet data, messages such as those transmitted using the Short Message Service (SMS) protocol, and/or other appropriate forms of data. Further, the signaling may include Signaling may include an acknowledgement (ACK), a negative acknowledgement (NACK), a request (REQ), channel quality information (CQI), power control information, and/or other appropriate types of control information and feedback. Further, data may be communicated between via one or more forward link and reverse link data channels, and signaling may be communicated via one or more forward link and reverse link control channels On the reverse link, many mobile terminals 220 in system 200 may transmit signaling to a single base station 210 simultaneously over corresponding control channels. However, to ensure optimal performance of system 200, the signaling received from each of the mobile terminals 220 at base station 210 via corresponding control channels may require extensive scheduling. For example, if a relatively large amount of mobile terminals 220 send signaling to a base station 210 at one point in time, the overall performance of system 200 may be reduced due to buffering and other additional operations required at base station 210 for accurate processing of the signaling. On the other hand, it may be beneficial for a relatively large number of mobile terminals 220 to send signaling to base station 210 at a single point in time, such as in an example where discontinuous transmission (DTX) is desired in order to conserve terminal battery life.

Thus, in accordance with one aspect, base station 210 includes a scheduling component 214 that schedules one or more reverse link control channels for each mobile terminal 220 communicating with base station 210. In one example, data and signaling is communicated between base station 210 and mobile terminal 220 on one or more physical layer frames ("frames") on the forward and reverse link. These frames can be interlaced by grouping multiple disjoint frames on the forward and reverse link into frame interlaces. Data and control channels for communication between base station 210 and each mobile terminal 220 can then be scheduled to all or part of the frames of an interlace. It should be appreciated that system 200 may utilize any number of frame interlaces and that the frame interlaces may be created by grouping together frames at uniform intervals (e.g., every n-th frame) or at non-uniform intervals.

In one example, a base station 210 in system 200 receives a communication at receiver 212 on the forward link via antenna 218 from a mobile terminal 220. In accordance with alternative aspects, the communication sent by mobile terminal 220 can be an initial communication for establishing a communication link between mobile terminal 220 and base station 210 or a communication sent pursuant to a pre-established communication link between mobile terminal 220 and base station 210. Once base station 210 receives the communication from mobile terminal 220, scheduling component 214 can determine conditions of one or more frame interlaces in system 200. For example, scheduling component 214 can determine the respective loading of control channels on each of the frame interlaces. Based on the determined conditions, scheduling component 214 can then assign one or more reverse link control channels for communication between base station 210 and mobile terminal 220 to frames in a frame interlace. Base station 210 can then communicate this assignment to mobile terminal 220 via transmitter 216 and antenna 218. Upon communication of the assignment, mobile terminal 220 can receive the assignment via receiver 224 and antenna 222. Signaling generator 226 at mobile terminal 220 may then generate signaling such as a request, an acknowledgement, channel quality information, or other appropriate signaling, which is then communicated to base station 210 on the reverse link by transmitter 228 via antenna 222 in one or more reverse link frames within a frame interlace assigned by base station 210.

In accordance with a further aspect, scheduling component 214 may be operable to schedule one or more types of control channels for communication with a mobile terminal 220. Each type of control channel may be scheduled based on general considerations and/or considerations unique to each specific control channel type. By way of non-limiting example, scheduling component 214 can schedule one or more of a CDMA control channel (CDCCH), an OFDMA control channel (ODCCH), an acknowledgement channel (ACKCH), and/or another appropriate control channel.

With respect to a specific, non-limiting example involving the scheduling of a CDCCH, each CDCCH for communication with mobile terminals 220 may be provided in a CDMA control segment utilized by system 200. The CDMA control segment may further be broken into a collection of subsegments, and control channels for one or more mobile terminals 220 that are capable of CDMA operation may be mapped to each subsegment. In one example, each subsegment may be capable of supporting a predetermined number of mobile terminals 220. In this example, scheduling component 214 at base station 210 can schedule CDMA control channels for communication with one or more mobile terminals 220 by scheduling the subsegments of the CDMA control segment having control channels mapped thereon to frames of one or more interlaces.

In one example, scheduling component 214 can schedule the subsegments such that overhead corresponding to the CDMA control segment is balanced among all frame interlaces. In another example, scheduling component 214 may schedule the subsegments over a relatively large number of frame interlaces to facilitate pipelined processing of signaling from mobile terminals 220 at base station 210 and to reduce the amount of required buffering by base station 210 on the control channels. Additionally and/or alternatively, scheduling component 214 may accumulate a number of subsegments on a single frame interlace to allow mobile terminals 220 to engage in discontinuous transmission (DTX). DTX allows a mobile terminal 220 to operate in a powered-down or "sleep" state when it is not transmitting data or signaling, thereby preserving the battery life of the mobile terminal 220. Scheduling component 214 may accumulate subsegments for DTX when, for example, one or more mobile terminals 220 are engaged in a power control operation or a hand-off operation between cells wherein a pilot is communicated to base station 210 on multiple CDMA subsegments. In such an operation, accumulating the CDMA subsegments can reduce the amount of frames on which a mobile terminal 220 must transmit signaling, thereby allowing the mobile terminal 220 to enter a powered-down state pursuant to DTX when not transmitting.

With respect to another specific, non-limiting example involving the scheduling of an ODCCH, each ODCCH for communication with mobile terminals 220 may be provided in an OFDMA control segment utilized by system 200. Accordingly, scheduling component 214 may schedule OFDMA control channels based on many of the same considerations used to schedule CDMA control channels as described above. However, unlike a CDMA control segment, each mobile terminal 220 is allocated a control channel in an individual portion of an OFDMA control segment. Further, in a FH-OFDMA system, an ODCCH can hop between frequencies and into a data channel provided at a frame interlace, thereby puncturing the data channel such that a mobile terminal 220 communicates signaling instead of data over the channel. Thus, scheduling component 214 can additionally take individual allocation and data channel punctures into consideration when scheduling an ODCCH.

In another specific, non-limiting example, system 200 may utilize both CDMA and OFDMA. Accordingly, one or more base stations 210 and mobile terminals 220 in system 200 may communicate using both a CDCCH provided in a CDMA control segment and an ODCCH provided in an OFDMA control segment. However, a mobile terminal 220 may not be able to transmit over both a CDCCH and an ODCCH simultaneously due to constraints on maximum transmit power and/or terminal battery life that may be imposed as a result of the simultaneous transmissions over multiple channels. Additionally, the waveform transmitted by the mobile terminal 220 resulting from transmitting over a CDCCH and an ODCCH simultaneously may have a high peak-to-average ratio, which may also increase required transmit power and decrease terminal battery life. Thus, scheduling component 214 may schedule CDMA control channels and OFDMA control channels such that each mobile terminal 220 is required to transmit on only one of a CDCCH and an ODCCH at a given point in time.

As an additional specific, non-limiting example, scheduling component 214 can schedule an ACKCH for one or more mobile terminals 220. In one example, each ACKCH utilized by system 200 may be provided via OFDMA. However, unlike an ODCCH, an ACKCH may be assigned to a channel used for communication rather than explicitly assigned to a mobile terminal 220. Thus, scheduling component 214 may assign a mobile terminal 220 to a data channel and/or control channel, thereby implicitly scheduling a corresponding ACKCH for the mobile terminal 220.

Figure 3:
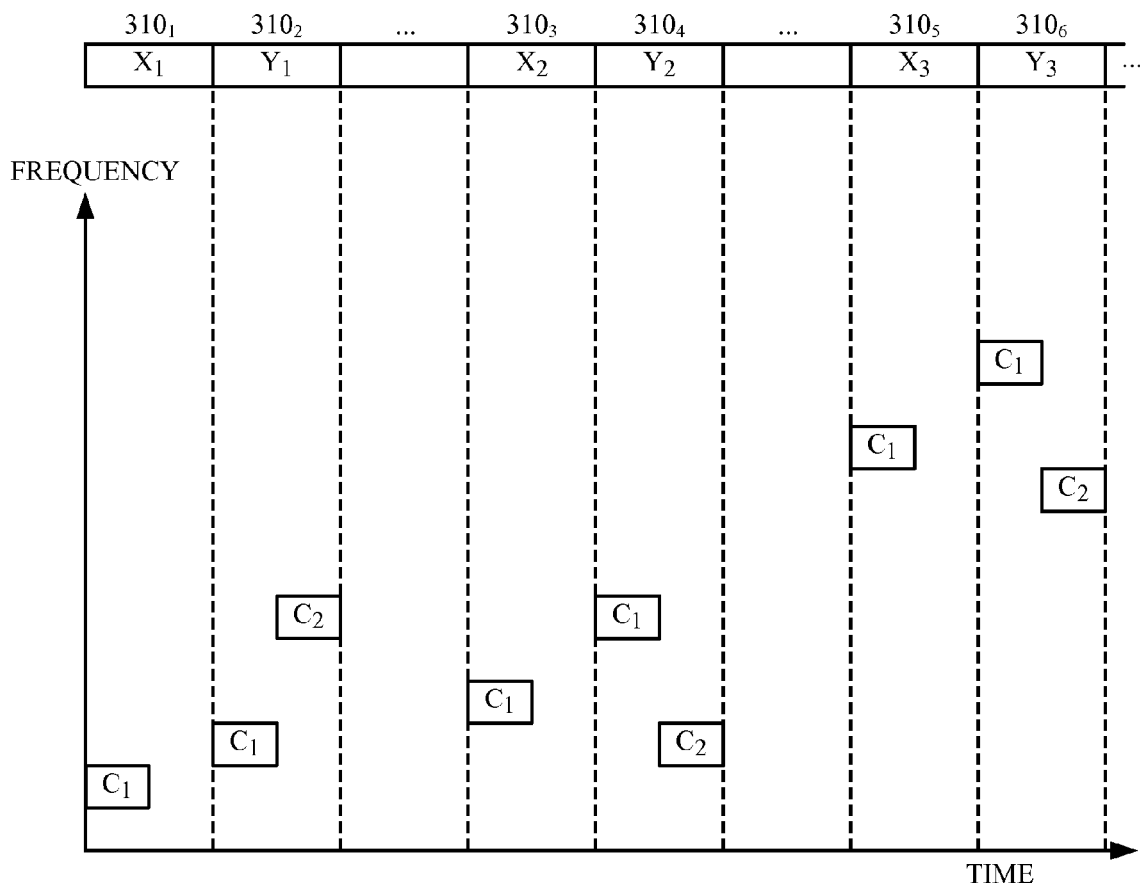
FIG. 3 illustrates an example control channel assignment in a wireless communication network in accordance with various aspects.

FIG. 3 is an illustration of an example control channel assignment 300 in a wireless communication network (e.g., system 100) in accordance with various aspects. In one example, data and control information are communicated within the wireless communication network in interlaced frames 310. In accordance with one aspect, the wireless communication network can employ one or more of FH-OFDMA, CDMA, or another appropriate mode of network communication. Further, frames 310 may contain multiple blocks and may be grouped into one or more frame interlaces. For example, as illustrated by FIG. 3, frames $310_1$, $310_3$, and $310_5$ are grouped into a first frame interlace X, and frames $310_2$, $310_4$, and $310_6$ are grouped into a second frame interlace Y. It should be appreciated that additional frames between frames $310_1$ and $310_3$ and frames $310_3$ and $310_5$ could be grouped into frame interlace X and that additional frames between frames $310_2$ and $310_4$ and frames $310_4$ and $310_6$ could be grouped into frame interlace Y. In addition, it should be appreciated that additional frame interlaces could be employed by the wireless communication network. Further, the frame interlaces used for control channel assignment 300 may be periodic or non-periodic, may comprise contiguous and/or non-contiguous frames, and may contain an equal or unequal number of frames. A frame interlace may also span multiple superframes such that, for example, one frame interlace spans a constant or variable number of superframes.

As illustrated in control channel assignment 300, control channels (e.g., for communication with one or more terminals 120) may be provided in one or more frames 310 of an interlace. In addition, each control channel may be scheduled on one or more interlaces. In the non-limiting example illustrated by control channel assignment 300, a first control channel $C_1$ is provided in each interlace X and Y while a second control channel $C_2$ is provided in only interlace Y. It should be appreciated that while control channels $C_1$ and $C_2$ are illustrated as being smaller than the duration of a frame 310 in time, the duration of each control channel may alternatively be the same or greater than a frame length. The control channels may be scheduled in the manner illustrated by assignment 300, for example, because of greater comparative loading on frame interlace Y from a scheduling standpoint. Alternatively, the control channels may be scheduled according to assignment 300 if the amount of control information for the terminals scheduled on frame interlace Y is greater than available network resources can support.

In one example, control information can be communicated on a first control channel at least one block in a frame 310 and on a second control channel at a second block in the frame 310. In a non-limiting example illustrated by control channel assignment 300, a first set of control information (e.g., ACK/NACK) can be communicated on control channel $C_1$ in frame $310_2$, and a second set of control information (e.g., REQ/CQI) can be communicated on control channel $C_2$ in frame $310_2$. It should be appreciated that the first set and second set of control information are provided by way of illustration and that the control information can be split between the control channels in any appropriate manner. Further, it should be appreciated that the blocks on which control channels are used may be contiguous or otherwise divided.

In another example, an assignment of one or more control channels for a terminal (e.g., a terminal 120) to be used for reverse link control transmission may be made implicit in one or more forward link transmissions (e.g., by a base station 110) to reduce the amount of messages that must be sent over the network. By way of non-limiting example, a first control channel (e.g., REQ/CQI) can be scheduled based on an assigned Media Access Control Identifier (MAC-ID) for a terminal, and a second control channel (e.g., ACK/NACK) can be scheduled based on the assigned MAC-ID for the terminal and/or the channel-ID of a forward link channel to be acknowledged. More particularly, one or more of a time, frequency, and code assignment corresponding to a reverse link control channel may correspond to the assigned MAC-ID or another unique identification code for a terminal. In one example, associations between an identification code for each terminal and one or more corresponding reverse link control channel assignments can be maintained in a database at one or more base stations. This database can also be maintained in the form of a table, such that knowing an identification code for a terminal can allow corresponding assigned blocks for one or more reverse link control channels to be found from a table.

In another example, information about a data channel, such as the channel-ID of the data channel, and/or information communicated on a forward link data channel to a terminal may correspond to the assigned blocks for one or more reverse link control channels assigned to the terminal. For example, a data channel assignment message communicated on the forward link may correspond to specific blocks assigned to a control channel, such as ACK/NACK, in a table maintained in a database at the base station.

Figure 4:
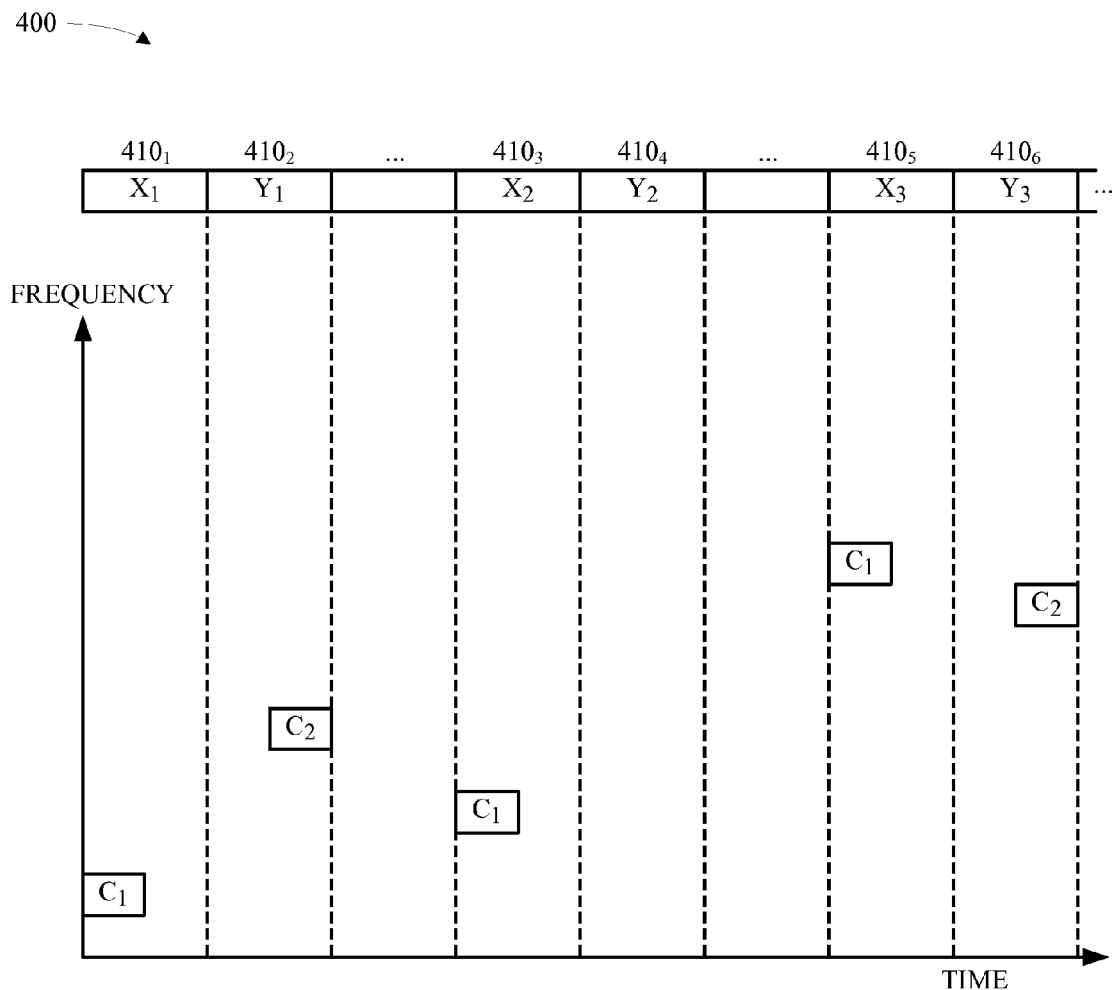
FIG. 4 illustrates an example control channel assignment in a wireless communication network in accordance with various aspects.

FIG. 4 is another illustration of an example control channel assignment 400 in a wireless communication network in accordance with various aspects. As illustrated by FIG. 4, frames $410_1$, $410_3$, and $410_5$ are grouped into a first frame interlace X, and frames $410_2$, $410_4$, and $410_6$ are grouped into a second frame interlace Y. Additionally, it should be appreciated that additional frames between frames $310_1$ and $310_3$ and frames $310_3$ and $310_5$ could be grouped into frame interlace X and that additional frames between frames $310_2$ and $310_4$ and frames $310_4$ and $310_6$ could be grouped into frame interlace Y. In addition, it should be appreciated that additional frame interlaces could be utilized in connection with control channel assignment 400 and that each interlace may be periodic or non-periodic, may comprise contiguous and/or non-contiguous frames, and may contain an equal or unequal number of frames.

As illustrated by control channel assignment 400, a first control channel $C_1$ is provided in each frame 410 in frame interlace X while a second control channel $C_2$ is provided in less than all frames 410 of frame interlace Y. Further, while control channels $C_1$ and $C_2$ are illustrated as being smaller than the duration of a frame 410 in time, it should be appreciated that the duration of each control channel may alternatively be the same or greater than a frame length. The control channels may be scheduled in the manner illustrated by assignment 400 due to, for example, light loading on frame interlace Y and heavier loading on frame interlace X. In one example, the control channels can be provided to all or part of the frames 410 in a frame interlace as illustrated by assignment 400 dynamically. This dynamic allocation of control channels can be based upon the loading of the frame interlaces, channel conditions, and/or other appropriate factors.

Figure 5:
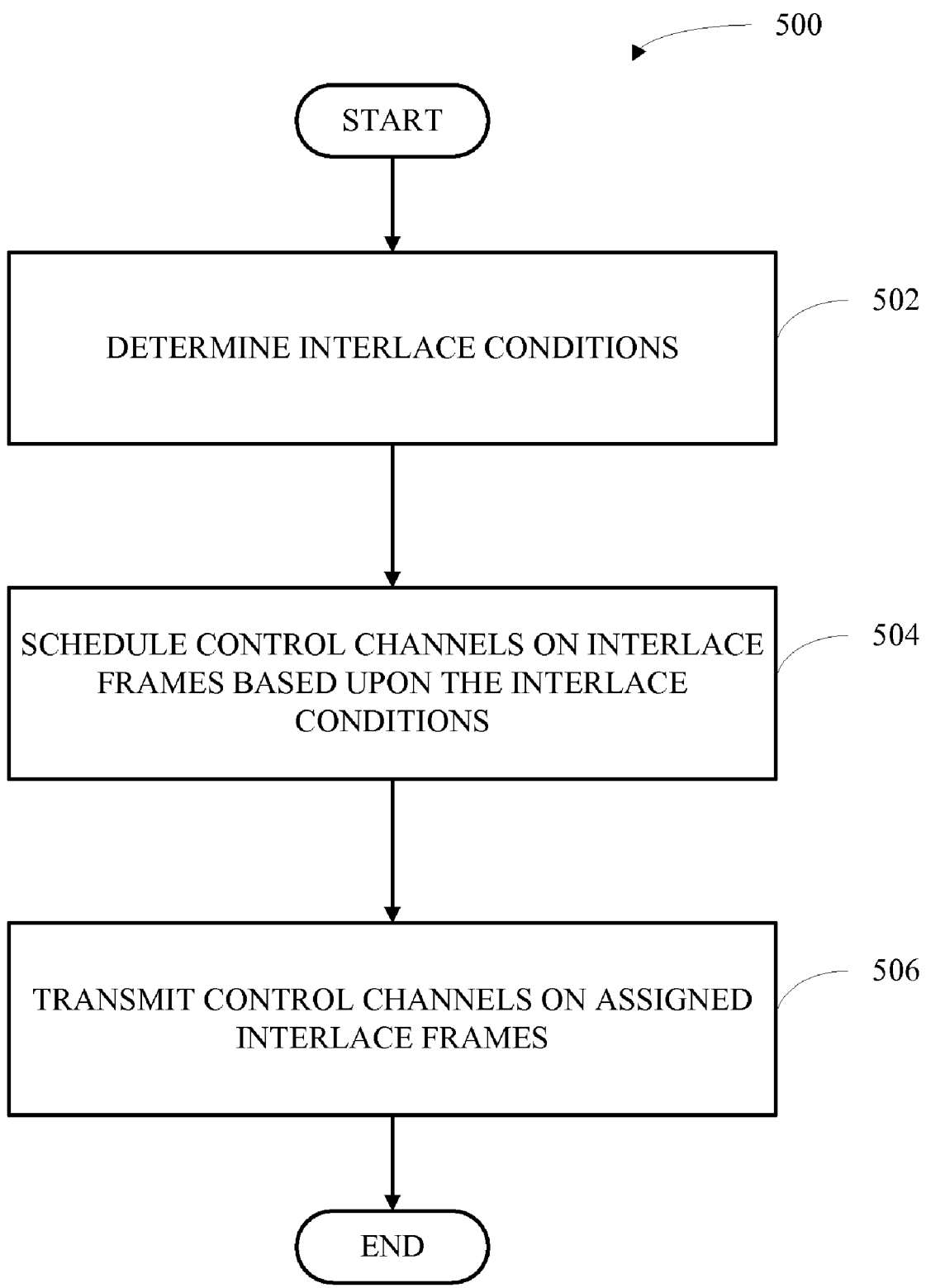
FIG. 5 is a flow diagram of a methodology for interlace-based control channel balancing in a wireless communication system.
Figure 6:
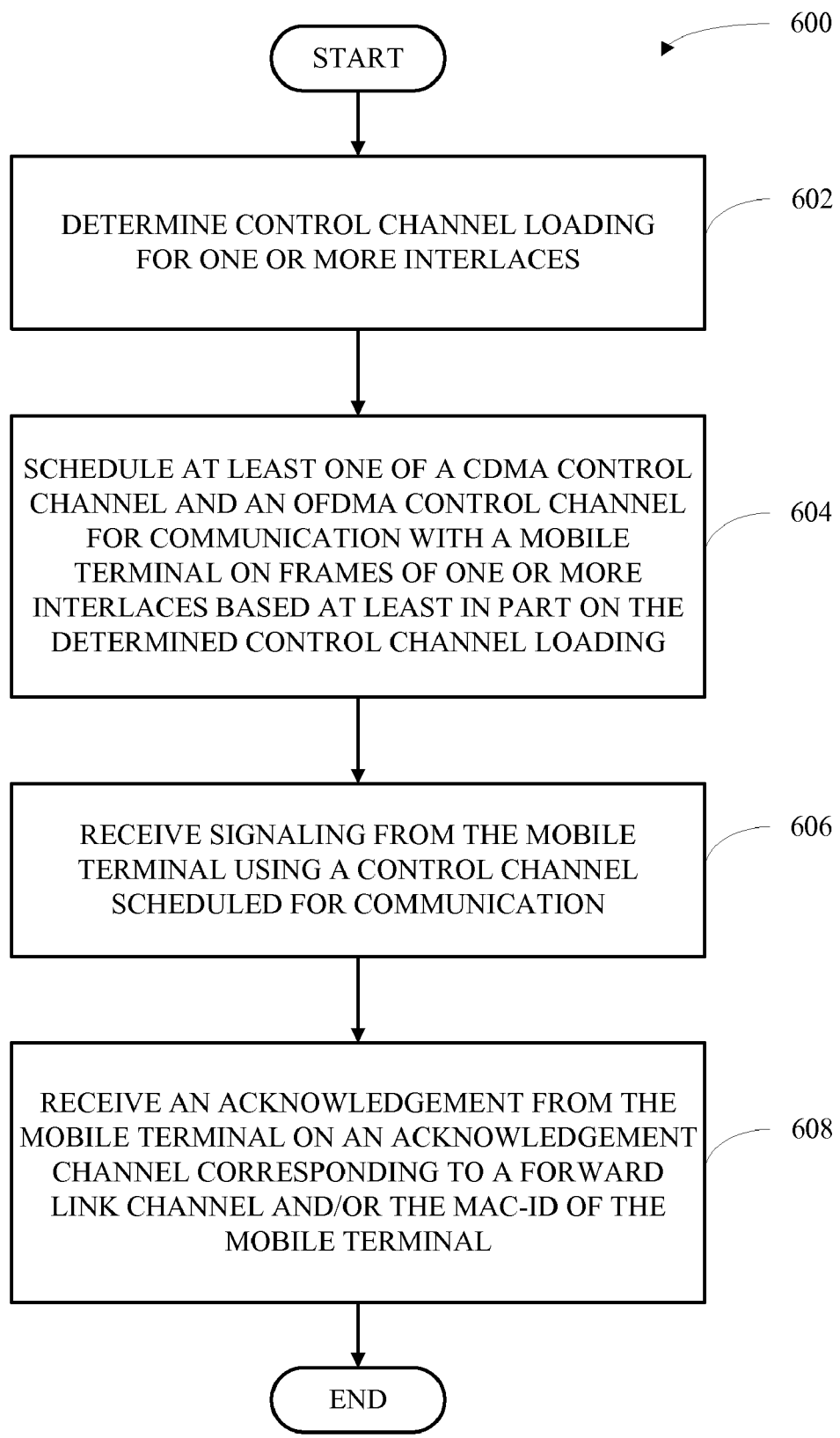
FIG. 6 is a flow diagram of a methodology for scheduling control channels in a wireless communication system.
Figure 7:
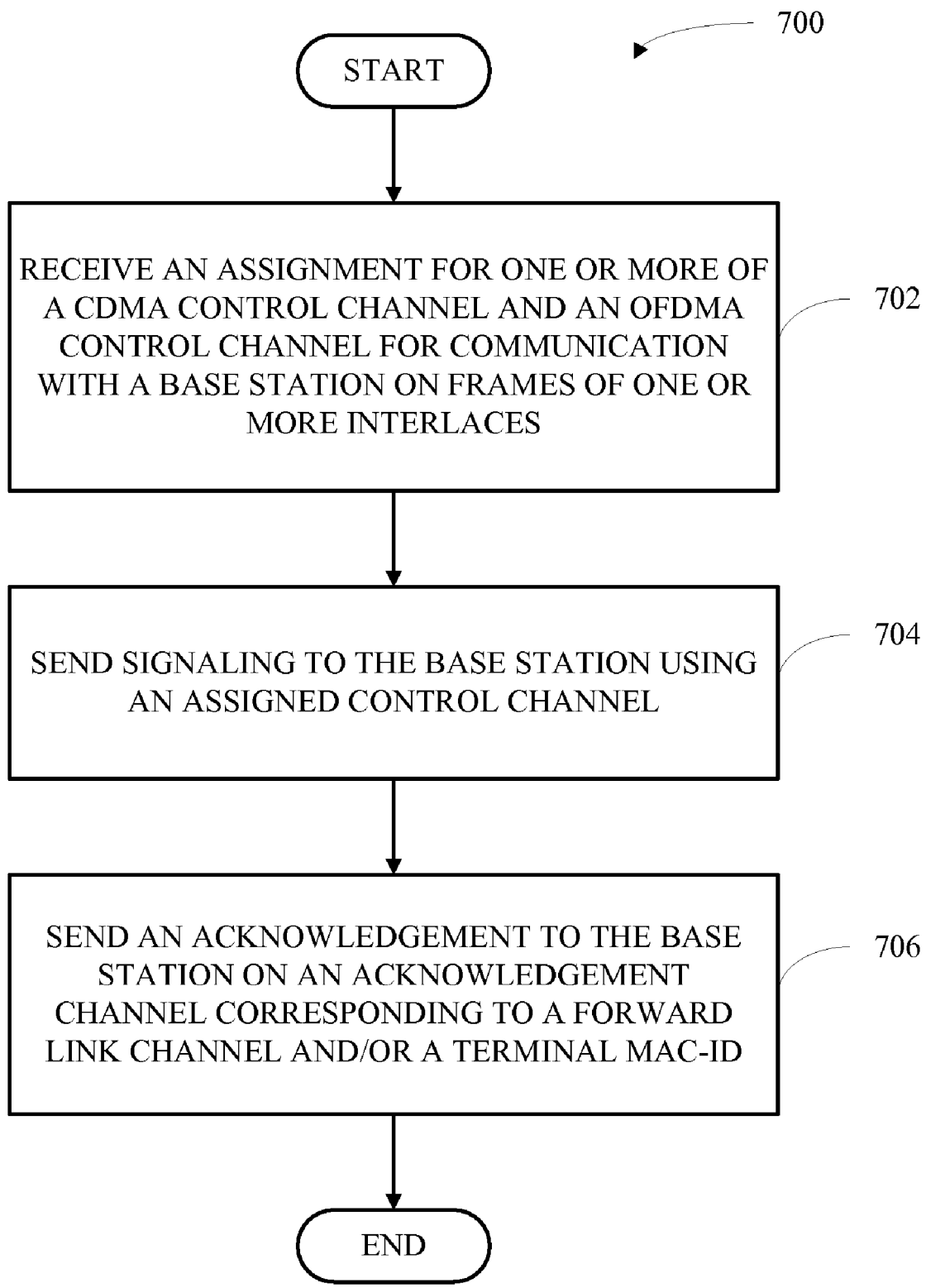
FIG. 7 is a flow diagram of a methodology for communicating signaling on a scheduled control channel in a wireless communication system.

Referring to FIGS. 5-7, methodologies for scheduling control channels in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 5, illustrated is a methodology 500 for interlace-based control channel balancing in a wireless communication system (e.g., system 200). It is to be appreciated that methodology 500 can be performed by one or more of a base station (e.g., base station 210) and a terminal (e.g., a mobile terminal 220) and a base station. Methodology 500 begins at block 502, wherein conditions corresponding to one or more frame interlaces are determined. In accordance with one aspect, the interlace conditions can include one or more of control channel loading on a frame interlace, total loading on a interlace, relative control channel loading on multiple frame interlaces, relative data channel loading on multiple frame interlaces, or other appropriate interlace conditions. Methodology 500 then proceeds to block 504, wherein one or more control channels are scheduled on interlace frames based upon the interlace conditions determined at block 502. In alternative examples, control channels can be assigned over all frame interlaces or a portion thereof. Additionally, control channels may be scheduled on all frames or a subset of frames in a given frame interlace. The methodology then concludes at block 506, wherein control channel information is transmitted on assigned frames in the appropriate frame interlaces. In one example, control information may be transmitted in frame interlaces as well as one or more appropriate superframe preambles.

FIG. 6 illustrates a methodology 600 for scheduling control channels in a wireless communication system (e.g., system 200). Methodology 600 can be performed, for example, by a base station (e.g., base station 210). Methodology 600 begins at block 602, wherein control channel loading is determined for one or more interlaces. In one example, the control channel loading can be individually measured for each interlace. Additionally and/or alternatively, relative loading on multiple interlaces can be determined. Next, at block 604, at least one of a CDMA control channel and an OFDMA control channel is scheduled for communication with a mobile terminal on frames of one or more interlaces based at least in part on the determined control channel loading. In accordance with one aspect, a control channel can be scheduled at block 604 on one interlace or multiple interlaces and on all frames or a subset of frames in each scheduled interlace. Further, the determined control channel loading can be used at block 604 for considering the extent to which system overhead is balanced among frame interlaces, the extent to which buffering is required for accurate processing of signaling received from one or more terminals, and/or the desirability of discontinuous transmission in the system. These considerations, as well as other appropriate considerations, can then be employed in scheduling the control channels at block 604.

Upon completing the act described in block 604, methodology 600 continues to block 606, wherein signaling is received from a terminal using a control channel scheduled for communication. The control channel used at block 606 can be, for example, a CDMA control channel and/or an OFDMA control channel scheduled at block 604. Further, the signaling can include an acknowledgement (ACK), a negative acknowledgement (NACK), a request (REQ), channel quality information (CQI), power control information, and/or other appropriate control information and feedback. Finally, at block 608, an acknowledgement is received from the mobile terminal on an acknowledgement channel. The acknowledgement channel used can correspond to, for example, a forward link channel used to transmit data and/or signaling from a base station (e.g., base station 210) to a terminal. Additionally and/or alternatively, the acknowledgement channel used can correspond to the MAC-ID of the terminal.

FIG. 7 illustrates a methodology 700 for scheduling control channels in a wireless communication system. Methodology 700 can be performed, for example, by a mobile terminal (e.g., mobile terminal 220). Methodology 700 begins at block 702, wherein an assignment is received for one or more of a CDMA control channel and an OFDMA control channel for communication with a base station (e.g., base station 210) on frames of one or more interlaces. Next, at block 704, signaling is sent to the base station using an assigned control channel. The assigned control channel can be, for example, a CDMA control channel and/or an OFDMA control channel assigned at block 702. Further, the signaling can include an acknowledgement (ACK), a negative acknowledgement (NACK), a request (REQ), channel quality information (CQI), power control information, and/or other appropriate control information and feedback. Finally, at block 706, an acknowledgment is sent to the base station on an acknowledgement channel. The acknowledgement channel used at block 706 can correspond to, for example, a forward link channel used to transmit data and/or signaling from a base station (e.g., base station 210) to a terminal. Additionally and/or alternatively, the acknowledgement channel used can correspond to a terminal MAC-ID (e.g., the MAC-ID of a terminal performing methodology 700).

Figure 8:
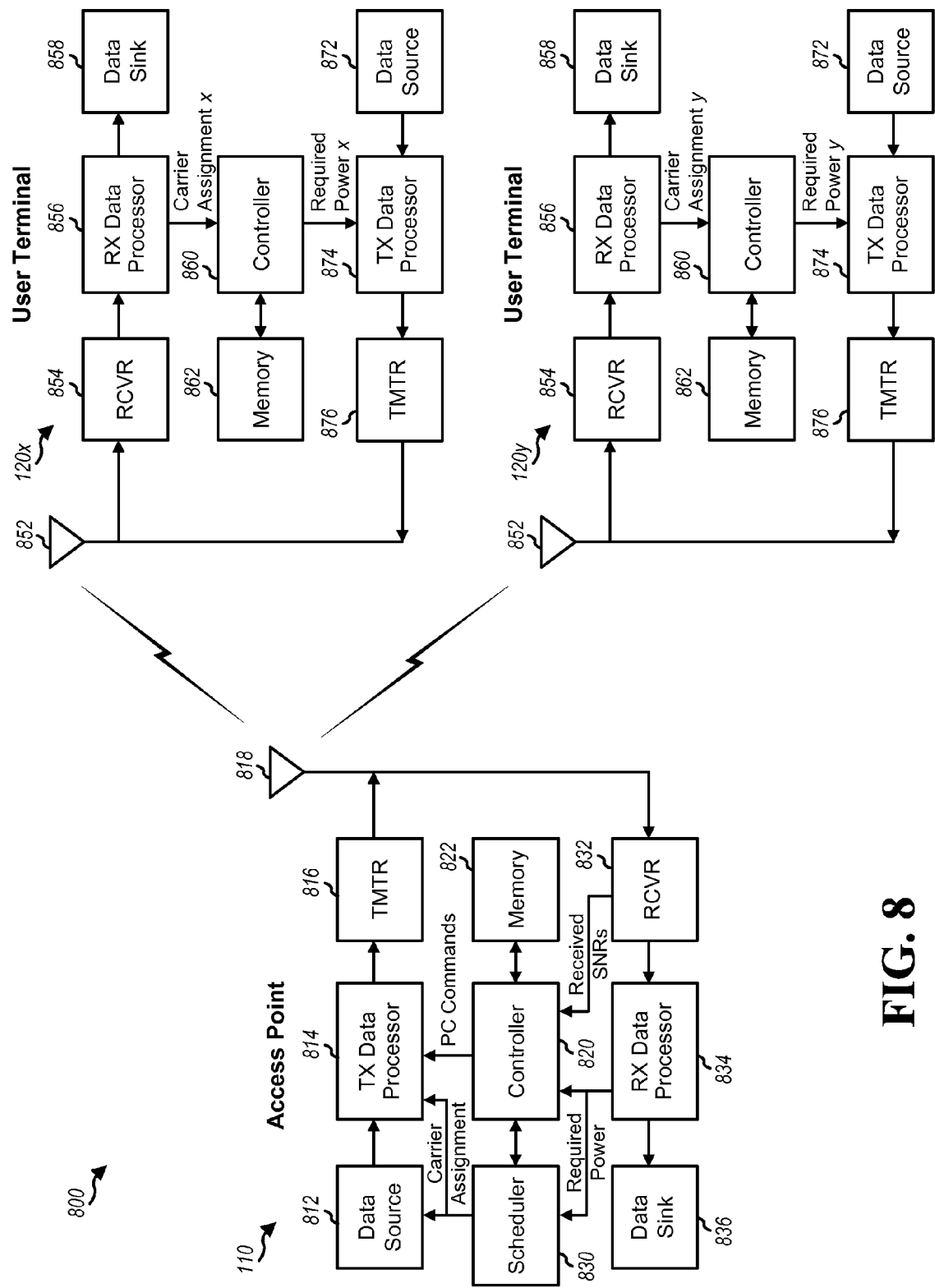
FIG. 8 is a block diagram illustrating an example wireless communication system in which one or more embodiments described herein may function.

Referring now to FIG. 8, a block diagram illustrating an example wireless communication system 800 in which one or more embodiments described herein may function is provided. In accordance with one aspect, the system 800 includes an access point 110, and user terminals 120x and 120y. In one example, access point 110 includes a transmit (TX) data processor 814 that receives traffic data (e.g., information bits) from a data source 812. Additionally, TX data processor can receive signaling and other information from a controller 820 and/or a scheduler 830. For example, controller 820 may provide power control (PC) commands that are used to adjust the transmit power of active user terminals 120, and scheduler 830 may provide assignments of carriers for the user terminals 120. In accordance with one aspect, the traffic and other types of data may be sent on different transport channels. Thus, in one example, TX data processor 814 can encode and modulate data using multi-carrier modulation such as orthogonal frequency division multiplexing (OFDM) to provide modulated data (e.g., OFDM symbols). A transmitter unit (TMTR) 816 can then processes the modulated data to generate a downlink modulated signal, which can then be transmitted from an antenna 818.

In another example, each user terminal 120x and 120y can receive the transmitted and modulated signal via an antenna 852. The signal can then be provided to a receiver unit (RCVR) 854. Receiver unit 854 can process and digitize the received signal to provide samples, which can then be demodulated and decoded by a receive (RX) data processor 856 to provide decoded data. The decoded data may include, for example, recovered traffic data, messages, signaling, and other suitable types of data. Traffic data recovered by RX data processor 856 may be provided to a data sink 858. Further, carrier assignment and PC commands received from access point 110 can be provided to a controller 860.

At user terminals 120, controller 860 directs uplink data transmission using the resources assigned to the terminal by access point 110 and indicated in the received assignment. In one example, when there is no data to transmit but a user terminal 120 desires to keep assigned resources, controller 860 can inject erasure signature packets. At access point 110, controller 820 directs downlink data transmission using the resources assigned to user terminals 120. In one example, when there is no data to transmit but access point 110 desires to keep assigned resources, controller 820 can also inject erasure signature packets.

In another example, a TX data processor 874 in each active terminal 120 can receive traffic data from a data source 872. Further, TX data processor 874 can receive signaling and other information from controller 860. For example, controller 860 may provide information indicative of channel quality information, required transmit power, maximum transmit power, or the difference between the maximum and required transmit powers for the terminal 120. TX data processor 874 can then code and modulate the data using assigned carriers. Once coded and modulated, the data can be further processed by a transmitter unit (TMTR) 876 to generate an uplink modulated signal that can then be transmitted to access point 110 via antenna 852.

In accordance with one aspect, transmitted and modulated signals from each user terminal 120 can be received by access point 110 via antenna 818, processed by a receiver unit (RCVR) 832, and demodulated and decoded by an RX data processor 834. Receiver unit 832 can estimate the quality of the received signal (e.g., signal-to-noise ratio (SNR)) from each user terminal 120 and provide this information to controller 820. Controller 820 can then derive PC commands for each user terminal 120 such that the received signal quality for each user terminal 120 is maintained within an acceptable range. Additionally, RX data processor 834 can provide recovered feedback information (e.g., required transmit power) for each user terminal 120 to controller 820 and scheduler 830. Based at least in part on the feedback information, scheduler 830 may provide an indication to controller 820 to maintain resources. This indication can be provided, for example, if more data is scheduled to be transmitted. Similarly, controller 860 in user terminals 120 may also determine if resources are required to be maintained. In another example, controller 820 at access point 110 can perform instructions that enable the functionality of scheduler 830.

Figure 9:
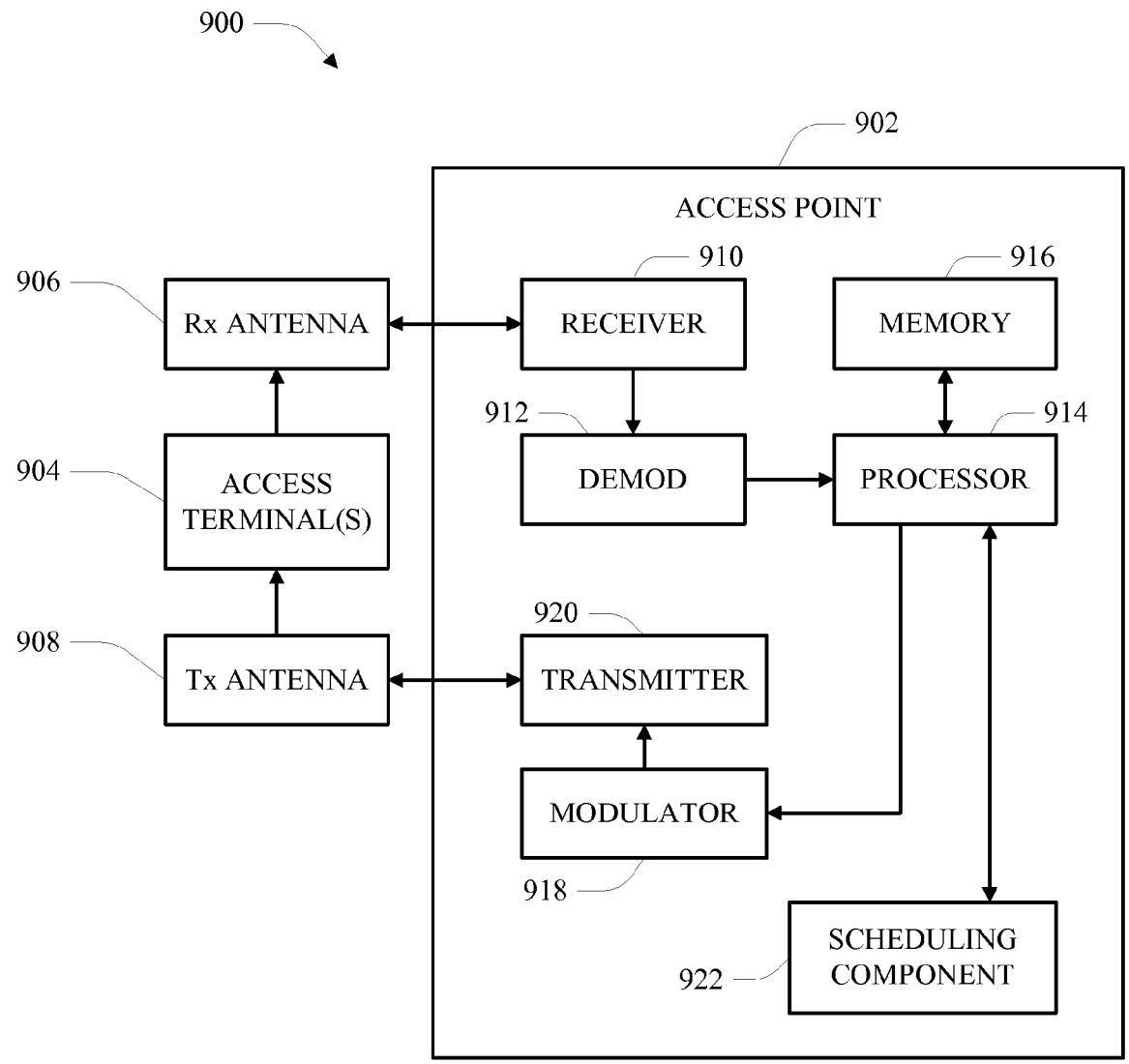
FIG. 9 is a block diagram of a system that coordinates scheduling of control channels among one or more wireless terminals in a wireless communication environment in accordance with various aspects.

FIG. 9 is a block diagram of a system 900 that coordinates scheduling of control channels among one or more wireless terminals in a wireless communication environment in accordance with various aspects described herein. In one example, system 900 includes a base station or access point 902. As illustrated, access point 902 can receive signal(s) from one or more access terminals 904 via a receive (Rx) antenna 906 and transmit to the one or more access terminals 904 via a transmit (Tx) antenna 908.

Additionally, access point 902 can comprise a receiver 910 that receives information from receive antenna 906. In one example, the receiver 910 can be operatively associated with a demodulator (Demod) 912 that demodulates received information. Demodulated symbols can then be analyzed by a processor 914. Processor 914 can be coupled to memory 916, which can store information related to code clusters, access terminal assignments, lookup tables related thereto, unique scrambling sequences, and/or other suitable types of information. Additionally and/or alternatively, processor 914 can be coupled to a scheduling component 922, which can facilitate the determination of loading and/or other conditions on one or more frame interlaces and the scheduling of control channels used for communication with access terminals 904. In one example, access point 902 can employ interlace component 922 to perform methodologies 500, 600, and/or other similar and appropriate methodologies either in conjunction with or independent from processor 914. Access point 902 can also include a modulator 918 that can multiplex a signal for transmission by a transmitter 920 through transmit antenna 908 to one or more access terminals 904.

Figure 10:
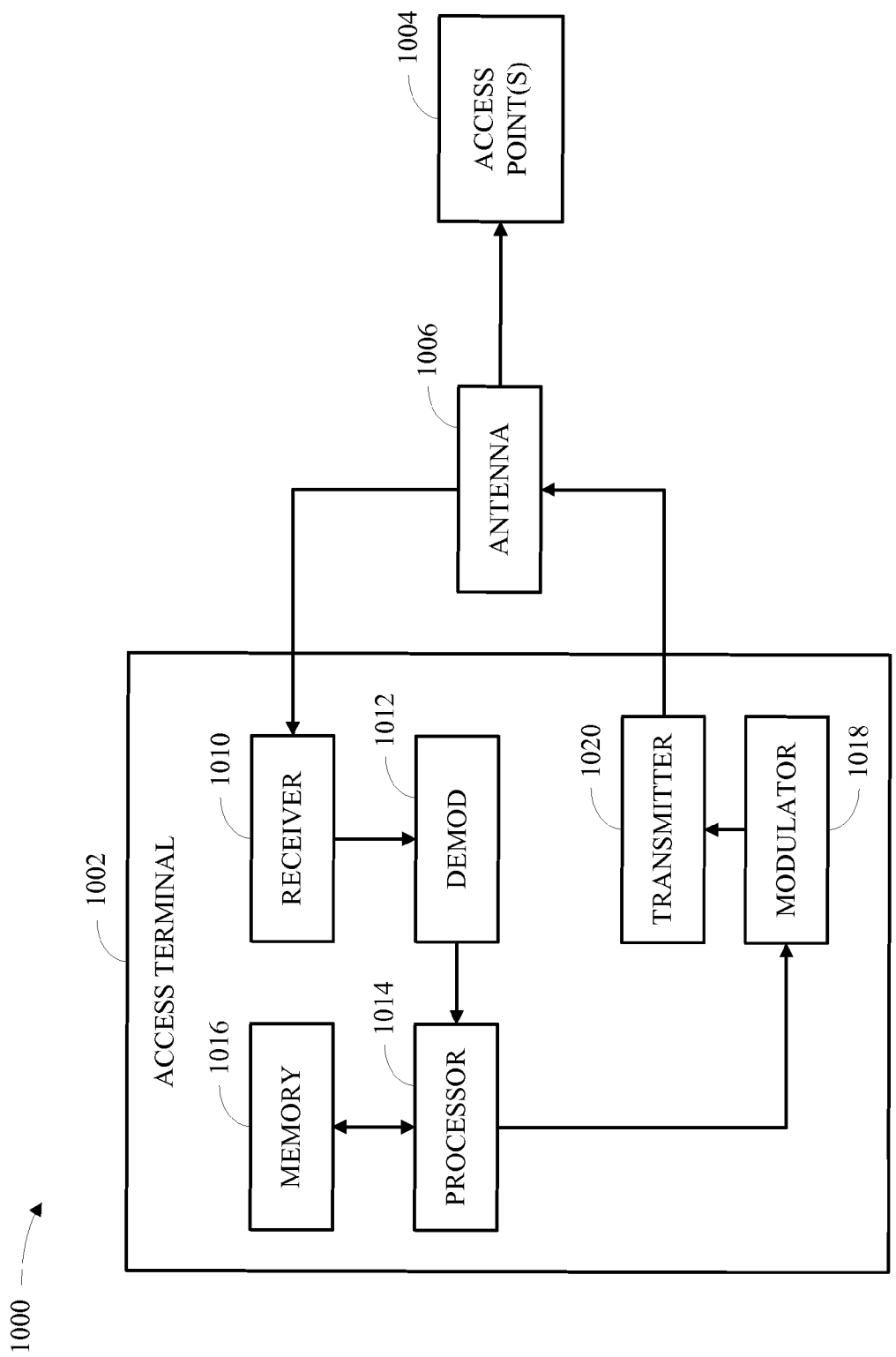
FIG. 10 is a block diagram of a system that coordinates communication of signaling in a wireless communication environment based on a communication schedule in accordance with various aspects.

FIG. 10 is a block diagram of a system 1000 that coordinates communication of signaling in a wireless communication environment based on a communication schedule in accordance with various aspects described herein. In one example, system 1000 includes an access terminal 1002. As illustrated, access terminal 1002 can receive signal(s) from one or more access points 1004 and transmit to the one or more access points 1004 via an antenna 1008. Additionally, access terminal 1002 can comprise a receiver 1010 that receives information from antenna 1008. In one example, receiver 1010 can be operatively associated with a demodulator (Demod) 1012 that demodulates received information. Demodulated symbols can then be analyzed by a processor 1014. Processor 1014 can be coupled to memory 1016, which can store data and/or program codes related to access terminal 1002. Additionally, access terminal 1002 can employ processor 1014 to perform methodologies 500, 700, and/or other appropriate methodologies. Access terminal 1002 can also include a modulator 1018 that can multiplex a signal for transmission by a transmitter 1020 through antenna 1008 to one or more base stations 1004.

Figure 11:
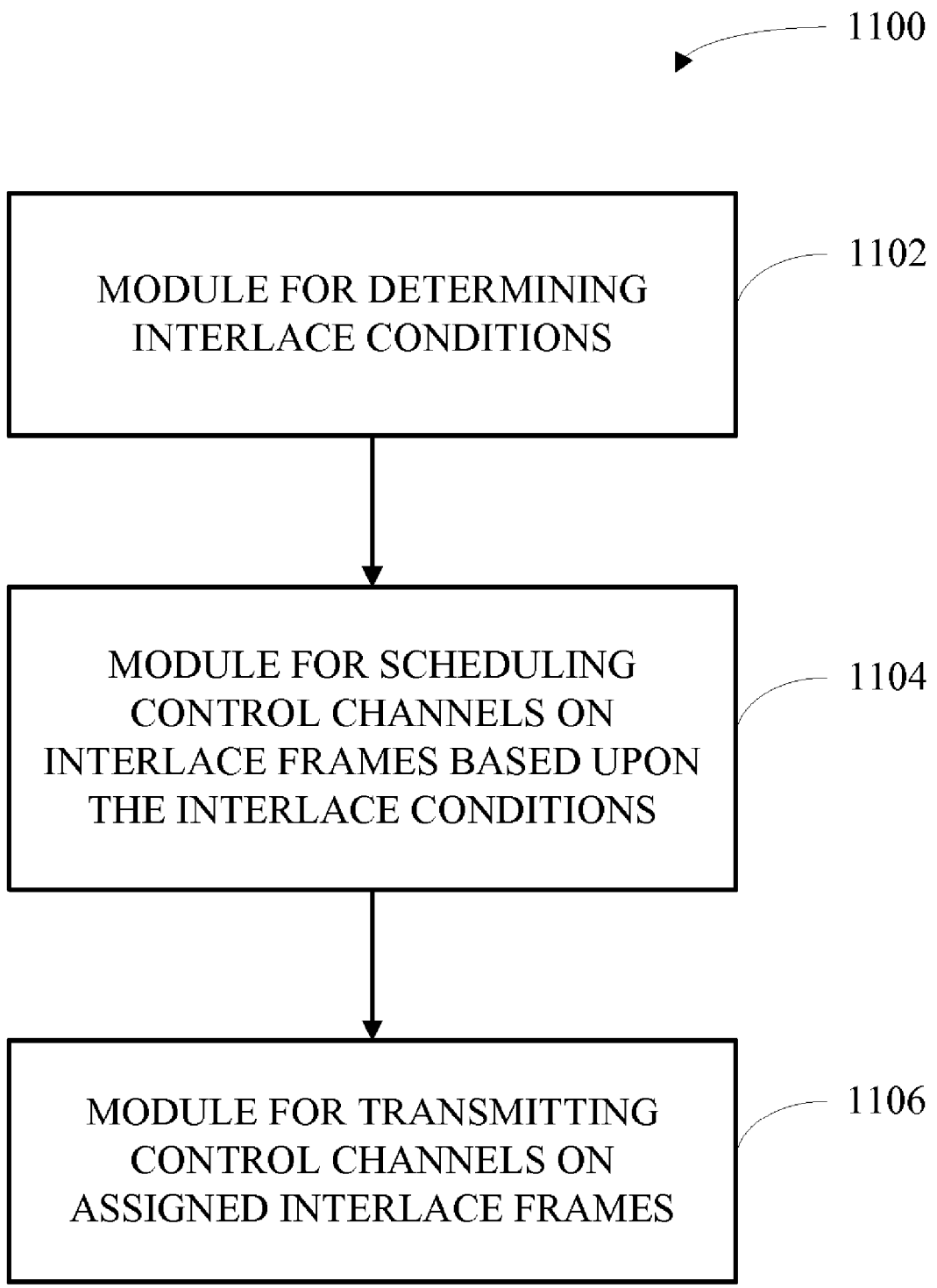
FIG. 11 is a block diagram of a system that facilitates interlace-based control channel balancing in a wireless communication system in accordance with various aspects.

FIG. 11 illustrates a system 1100 that facilitates interlace-based control channel balancing in a wireless communication system (e.g., system 200). It is to be appreciated that system 1100 is represented as including functional blocks, which can be functional blocks that represent functions implemented by a processor, software, or combination thereof (e.g., firmware). System 1100 can be implemented in a base station (e.g., base station 210) or a terminal (e.g., mobile terminal 220) and can include a module for determining interlace conditions 1102. Further, system 1100 can include a module for scheduling control channels on interlace frames based upon the interlace conditions 1104 and a module for transmitting control channels on assigned interlace frames 1106.

Figure 12:
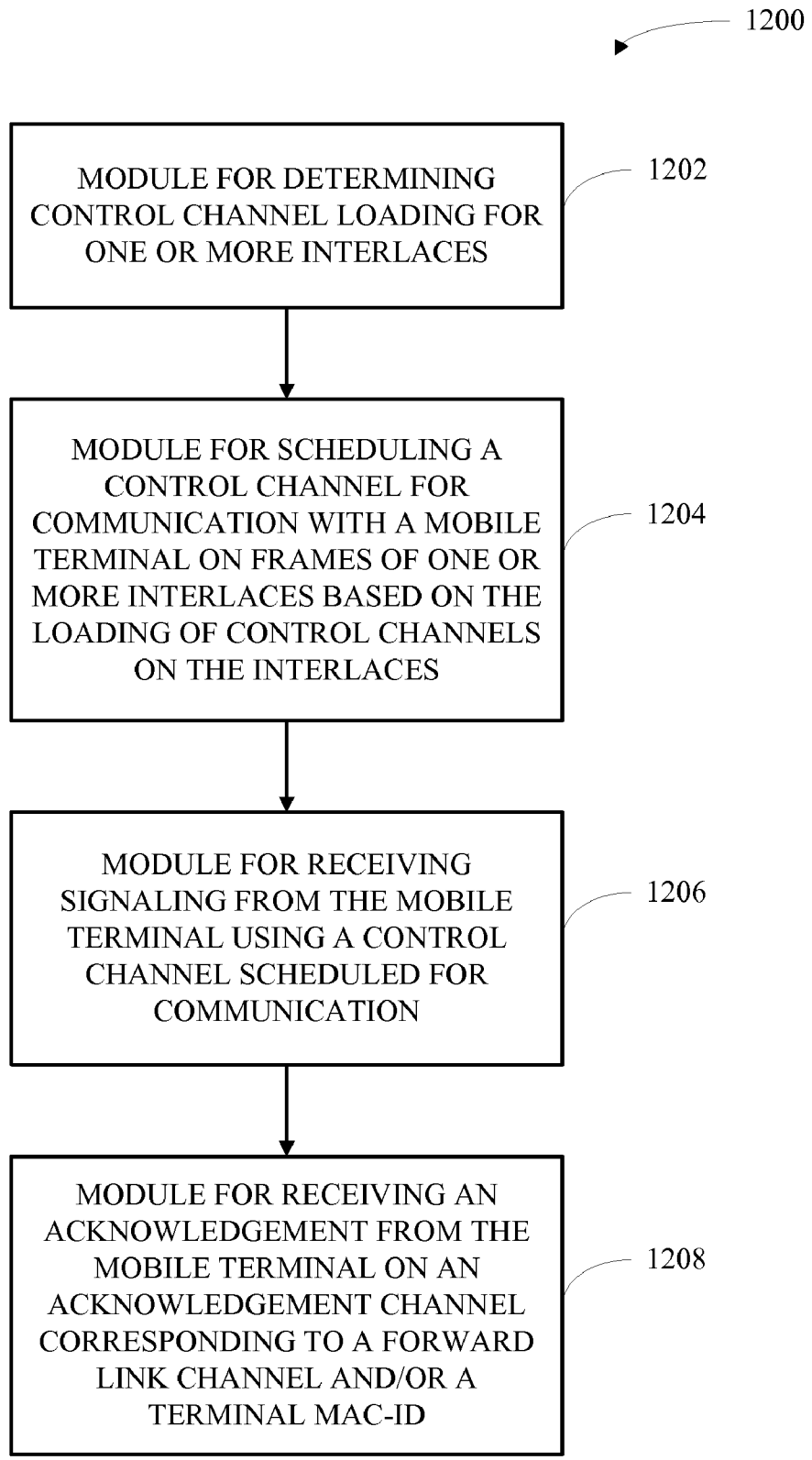
FIG. 12 is a block diagram of an apparatus that schedules control channels in a wireless communication system in accordance with various aspects.

FIG. 12 illustrates an apparatus 1200 that schedules control channels in a wireless communication system. It is to be appreciated that apparatus 1200 is represented as including functional blocks, which can be functional blocks that represent functions implemented by a processor, software, or combination thereof (e.g., firmware). Apparatus 1200 can be implemented in conjunction with a base station and can include a module for determining control channel loading on one or more interlaces 1202. Further, apparatus 1200 can comprise a module for scheduling a control channel for communication with a mobile terminal on frames of one or more interlaces based on the loading of control channels on the interlaces 1204, a module for receiving signaling from the mobile terminal using a control channel scheduled for communication 1206, and a module for receiving an acknowledgement from the mobile terminal on an acknowledgement channel corresponding to a forward link channel and/or a terminal MAC-ID 1208.

Figure 13:
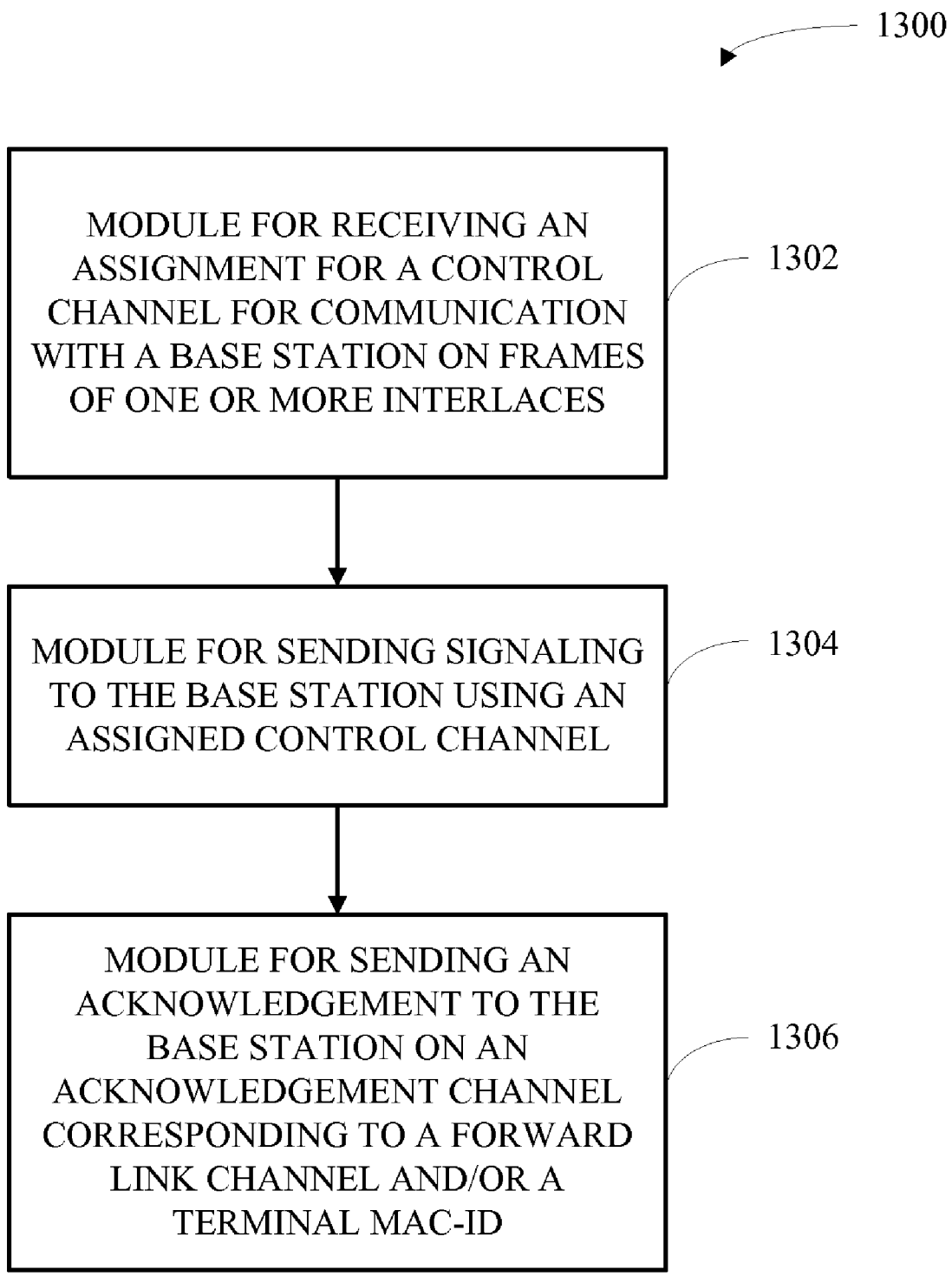
FIG. 13 is a block diagram of an apparatus that communicates signaling on a scheduled control channel in a wireless communication system in accordance with various aspects.

FIG. 13 illustrates an apparatus 1300 that communicates signaling on a scheduled control channel in a wireless communication system. It is to be appreciated that apparatus 1300 is represented as including functional blocks, which can be functional blocks that represent functions implemented by a processor, software, or combination thereof (e.g., firmware). Apparatus 1300 can be implemented in conjunction with a mobile terminal and can include a module for receiving an assignment for a control channel for communication with a base station on frames of one or more interlaces 1302. Further, apparatus 1300 can comprise a module for sending signaling to the base station using an assigned control channel 1304 and a module for sending an acknowledgement to the base station on an acknowledgement channel corresponding to a forward link channel and/or a terminal MAC-ID 1306.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for scheduling control channels in a wireless communication system, comprising:
   determining one or more of control channel loading and data channel loading for one or more frame interlaces, each frame interlace having a plurality of frames on a forward link and a reverse link;
   determining power restrictions for one or more mobile terminals in the wireless communication system; and
   scheduling one or more control channels for communication with a mobile terminal in the one or more mobile terminals on one or more frames of at least one frame interlace based at least in part on the determined power restrictions for the mobile terminal and one or more of the determined data channel loading for the frame interlaces and the determined control channel loading for the frame interlaces.

2. The method of claim 1, wherein the scheduling one or more control channels includes scheduling a CDMA control channel.

3. The method of claim 2, wherein the CDMA control channel corresponds to a CDMA control segment and the scheduling a CDMA control channel includes mapping the mobile terminal to a subsegment of the CDMA control segment.

4. The method of claim 3, wherein the determining one or more of control channel loading and data channel loading includes determining control channel loading for each subsegment of the CDMA control segment.

5. The method of claim 1, wherein the scheduling one or more control channels includes scheduling an OFDMA control channel.

6. The method of claim 5, wherein the OFDMA control channel corresponds to an OFDMA control segment and the scheduling an OFDMA control channel includes allocating a portion of the OFDMA control segment to the mobile terminal.

7. The method of claim 1, wherein the scheduling one or more control channels includes scheduling a CDMA control channel and an OFDMA control channel.

8. The method of claim 7, wherein the scheduling one or more control channels includes scheduling the CDMA control channel and the OFDMA control channel on frames of one or more frame interlaces such that the mobile terminal does not transmit on both the CDMA control channel and the OFDMA control channel at a common frame.

9. The method of claim 1, wherein the scheduling one or more control channels includes scheduling an acknowledgement channel.

10. The method of claim 9, wherein the scheduling one or more control channels further includes scheduling an acknowledgement channel based at least in part on a Media Access Control Identifier (MAC-ID) for the mobile terminal.

11. The method of claim 1, further comprising receiving signaling from the mobile terminal at a frame in the reverse link using at least one control channel scheduled for communication.

12. The method of claim 11, wherein the receiving signaling from the mobile terminal includes:
   receiving first signaling from the mobile terminal on a first control channel at a first block of the frame in the reverse link; and
   receiving second signaling from the mobile terminal on a second control channel at a second block of the frame in the reverse link.

13. The method of claim 11, wherein the signaling includes one or more of an acknowledgement, a negative acknowledgement, channel quality information, and a request.

14. The method of claim 1, wherein the scheduling one or more control channels includes dynamically re-scheduling the one or more control channels for communication with a mobile terminal based at least in part on a change in the determined conditions for the frame interlaces.

15. The method of claim 1, the method further comprising:
   receiving at the mobile terminal an assignment for one or more control channels for communication with a base station on one or more frame interlaces; and
   sending signaling to the base station using at least one assigned control channel.

16. A wireless communications apparatus, comprising:
   a memory that stores data relating to one or more frame interlaces, each frame interlace having a plurality of frames on a forward link and a reverse link; and
   a processor configured to determine at least one of loading conditions for the one or more frame interlaces and power conditions for one or more access terminals and to schedule a control channel for communication with an access terminal in the one or more access terminals on at least one frame in the one or more frame interlaces based on at least one of the determined loading conditions and the determined power conditions.

17. The wireless communications apparatus of claim 16, wherein the processor is further configured to schedule at least one of a CDMA control channel, an OFDMA control channel, and an acknowledgement channel for communication with the access terminal on the reverse link.

18. The wireless communications apparatus of claim 17, wherein the processor is further configured to schedule a CDMA control channel and an OFDMA control channel for communication with the access terminal on at least one frame in the one or more frame interlaces such that only one of the CDMA control channel and the OFDMA control channel may be used for communication on any of the scheduled frames.

19. The wireless communications apparatus of claim 16, wherein the memory further stores data relating to an identification code for the access terminal, and the processor is further configured to schedule the control channel based at least in part on the identification code for the access terminal.

20. The wireless communications apparatus of claim 16, wherein the processor is further configured to schedule a control channel on one or more frame interlaces at least in part by accumulating a plurality of control channels on a frame interlace, thereby facilitating the use of discontinuous transmission at the access terminal.

21. The wireless communications apparatus of claim 16, wherein the processor is further configured to schedule a control channel on one or more frame interlaces at least in part by minimizing a difference in loading conditions between the one or more frame interlaces or power conditions for the access terminal.

22. The wireless communications apparatus of claim 16, further comprising at least one access terminal, the at least one access terminal comprising:
   a memory that stores data relating to an assignment for at least one control channel for communication with an access point on one or more frame interlaces; and
   a processor configured to send control information to the access point on an assigned control channel.

23. An apparatus that facilitates the scheduling of control channels in a wireless communication system, comprising:

means for grouping frames on a reverse link into one or more frame interlaces;

means for determining loading on the one or more frame interlaces and power restrictions for a wireless terminal; and means for scheduling one or more control channels for communication with the wireless terminal on at least one of the one or more frame interlaces based on at least one of the determined loading on the one or more frame interlaces and the determined power restrictions for the wireless terminal.

24. The apparatus of claim 23, wherein the means for grouping frames on the reverse link groups non-contiguous frames into the one or more frame interlaces.

25. The apparatus of claim 23, wherein each of the one or more frame interlaces includes frames having a uniform distance from each other, the uniform distance corresponding to an interlace period.

26. The apparatus of claim 23, wherein the means for scheduling one or more control channels includes means for communicating the one or more scheduled control channels to the wireless terminal implicitly in a communication of data to the wireless terminal on a forward link.

27. The apparatus of claim 23, wherein the means for scheduling one or more control channels includes means for scheduling a control channel based at least in part on an identification code for the wireless terminal.

28. The apparatus of claim 23, wherein the means for scheduling one or more control channels includes means for re-scheduling the one or more control channels based at least in part on an alteration in the determined loading on the one or more frame interlaces or power restrictions for the wireless terminal.

29. A computer-readable medium having stored thereon computer-executable instructions for scheduling control channels in a wireless communication system, the instructions configured to cause an apparatus to perform operations comprising:

determining loading on one or more frame interlaces;
determining power conditions for a terminal;
assigning one or more control channels for communication with the terminal on one or more frames of at least one frame interlace based at least in part on the determined loading and power conditions; and
receiving control information from the terminal on the one or more assigned control channels.

30. The computer-readable medium of claim 29, wherein the one or more control channels include at least one of a CDMA control channel, an OFDMA control channel, and an acknowledgement channel.

31. The computer-readable medium of claim 29, wherein the instructions for receiving control information includes instructions for receiving first control information on a CDMA control channel on a first frame of an assigned frame interlace and instructions for receiving second control information on an OFDMA control channel on a second frame of the assigned frame interlace.

32. The computer-readable medium of claim 29, the instructions further comprising:

receiving an assignment for one or more control channels; and
transmitting control information on the one or more control channels.

33. A processor that executes computer-executable instructions for assigning control channels in a wireless communication system, the instructions comprising:

scheduling one or more control channels for communication with a mobile terminal on one or more frame interlaces selected from a plurality of frame interlaces based at least in part on one or more of loading on the plurality of frame interlaces and power requirements for the mobile terminal; and
receiving signaling from the mobile terminal on the one or more scheduled control channels.

34. The processor of claim 33, wherein the loading on the plurality of frame interlaces include at least one of data channel loading on the plurality of frame interlaces and control channel loading on the plurality of frame interlaces.

* * * * *